United States Patent Office 3,302,071
Patented Jan. 31, 1967

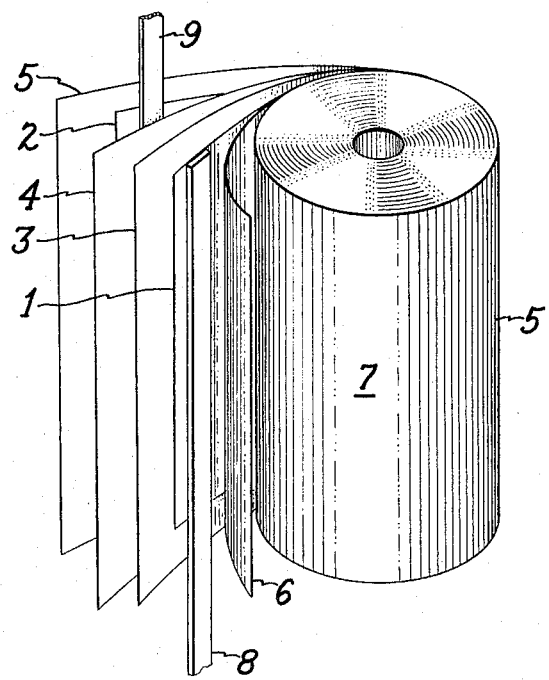
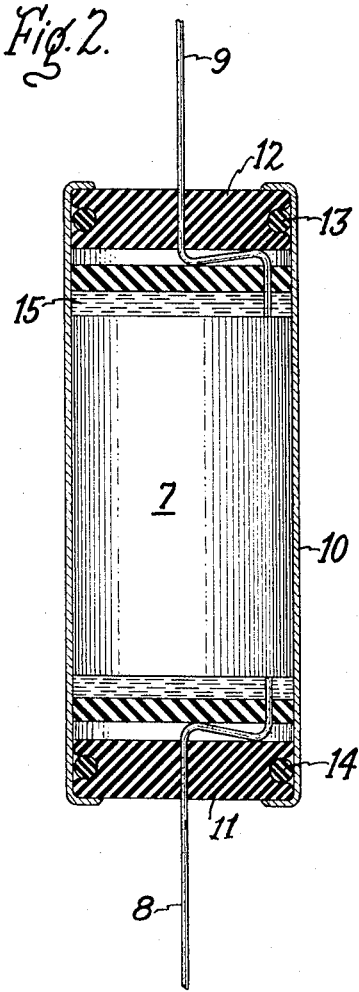

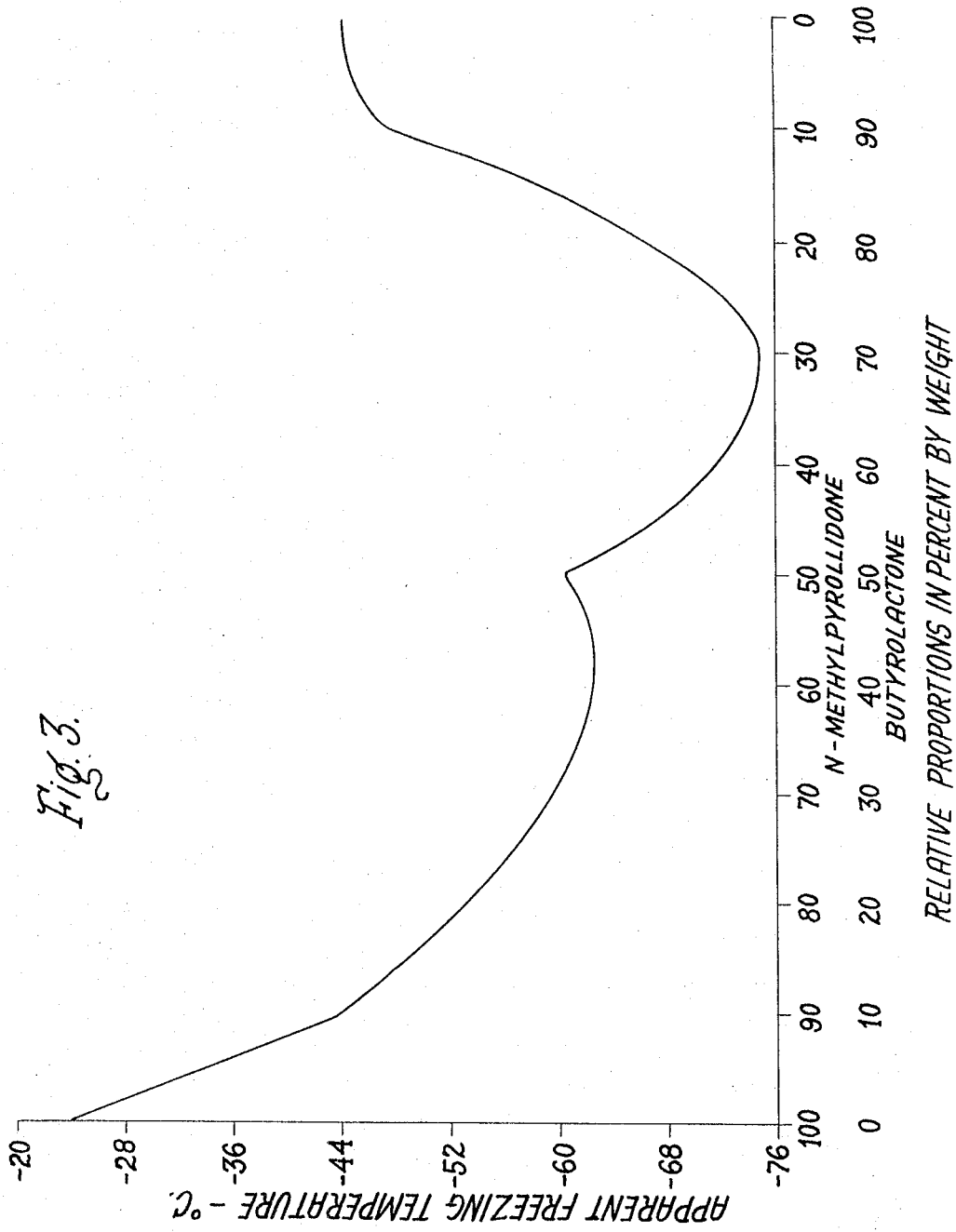

3,302,071
ELECTROLYTIC CAPACITOR AND ELECTROLYTE MATERIAL OPERATING OVER WIDE TEMPERATURE RANGE
Henry M. Stahr, Columbia, S.C., assignor to General Electric Company, a corporation of New York
Filed Jan. 29, 1963, Ser. No. 254,678
11 Claims. (Cl. 317—230)

The present invention relates to electrolytic capacitors, and more particularly to an improved electrolyte therefor.

Aqueous electrolytes of various compositions are commonly used in electrolytic capacitors, but such electrolytes are subject to certain disadvantages. The relatively high vapor pressure of aqueous electrolytes results in a loss of water and leads to changes in the characteristics of the capacitor. Such electrolytes are also known to adversely affect the anodic films of capacitor electrodes as, for example, due to hydration of the crystalline oxide film on aluminum electrodes or to transformation of the tantalum oxide film on tantalum electrodes to a form which causes higher leakage current and loss of capacitance.

While non-aqueous capacitor electrolytes are known in the art, the prior compositions of this type have certain limitations, such as insufficiently wide range of temperature conditions, insufficiently high boiling point, inadequate stability of electrical characteristics over varying temperature conditions, and other disadvantages.

It is an object of the invention to provide an electrolytic capacitor having an improved electrolyte which overcomes the above-mentioned disadvantages of prior types of electrolytic capacitors and electrolytes.

It is another object of the invention to provide a nonaqueous electrolyte, especially for electrolytic capacitors, which has a high boiling point and low vapor pressure, and which thereby extends the upper operating temperature range of the capacitor or other device in which it is incorporated.

It is still a further object of the invention to provide a novel electrolyte mixture having a broad range of proportions of the components thereof and having a very low freezing point.

It is another object of the invention to provide an electrolyte mixture of the above type which has a relatively constant composition over a wide range of temperature conditions.

Still another object of the invention is to provide electrolytic capacitors having good stability of electric characteristics as a function of time, temperature and voltage.

It is a further object of the invention to provide an electrolytic capacitor suitable for operation at elevated temperatures up to 200° C. or higher without the risk of corrosion effects such as characterize prior art capacitors.

Other objects and advantages will become apparent from the following description and the appended claims.

With the above objects in view, the invention relates to an electrolytic capacitor comprising a pair of electrodes, at least one of which is composed of a film-forming metal, and an electrolyte comprising a mixture of N-methylpyrrolidone and butyrolactone, and an ionogen dissolved therein.

The solvent mixture may be modified by the addition thereto of other materials such as the organic compounds hereinafter described for varying the properties of the electrolyte in the desired manner.

The invention will be better understood from the following description taken in conjunction with the accompanying drawings, in which:

FIGURE 1 shows a wound electrolytic capacitor section to which the invention is applicable;

FIGURE 2 shows a capacitor assembly with the capacitor section of FIGURE 1 enclosed in a casing and immersed in a liquid electrolyte of the present invention; and FIGURE 3 is a graph showing properties of the electrolyte mixture of the invention.

Referring now to the drawings, and in particular to FIGURE 1, there is shown a partially unrolled capacitor roll section of conventional construction comprising a pair of electrode foils 1 and 2, at least one of which is made of tantalum, aluminum, or other suitable filmforming metal which may be advantageously, although not necessarily, etched, and which has a dielectric oxide film thereon, the foils in the operation of the capacitor having opposite polarity. The dielectric oxide film may be produced by film-forming (usually anodizing) processes well known in the electrolytic capacitor art. Between foils 1 and 2 are sheets of dielectric spacer material 3, 4, 5, and 6 composed of cellulosic material, including paper made of vegetable fiber, such as Benares hemp, or other suitable material of permeable or porous impregnatable nature. Terminals or tap straps 8 or 9 are secured to the respective electrode foils and extend in opposite directions. The electrode foils and dielectric sheets are wound into a compact roll 7 prior to insertion into the casing, as shown in FIGURE 2.

FIGURE 2 shows the capacitor roll assembly 7 enclosed in a metal casing 10 with terminals 8 and 9 extending respectively through sealing plugs 11, 12 made of insulating material such as a synthetic resin. Each insulating plug 11, 12 has a resilient O-ring 13, 14 arranged in a groove in the periphery of the plug and compressed by casing 10, thus providing a fluid-tight seal for the interior of the casing. Electrolyte 15, having a novel composition as more fully described hereinafter, fills casing 10 and impregnates the porous spacer material.

In a polar type capacitor, only one of the electrode foils (the anode) will have an anodic dielectric oxide film thereon. In a non-polar capacitor, both electrode foils will have such films thereon.

Instead of the arrangement shown in FIGURES 1 and 2, wherein the roll is formed by wound cathode and anode foils, the capacitor roll may be constituted by only one electrode foil (anode) having a dielectric film thereon, the cathode being constituted by the outer casing. In such arrangement, the casing is typically made of silver.

While a rolled foil type of electrolytic capacitor is shown, it will be understood that other types of electrolytic capacitors employing liquid electrolytes, such as porous anode, wire, or other well known types of capacitors, may embody the present invention for obtaining similar benefits.

The electrolyte of the present invention is composed principally of a mixture of butyrolactone and N-methylpyrrolidone, the mixture having dissolved therein a salt or other compound serving as an ionogen in the solution. It has been found that the electrolyte mixture containing the described components provides excellent electrical properties and life characteristics for the capacitor, and affords in addition an unexpectedly wide range of temperature conditions under which it remains liquid and fully operative as an electrolyte.

FIGURE 3 is a graph showing the apparent freezing point properties of varying compositions of such a mixture. In the graph, the apparent freezing temperature in degrees centigrade is plotted against the proportions in percent by weight of butyrolactone and N-methylpyrrolidone in the mixture. The word "apparent" is used to denote the fact that these liquids do not become crystalline below the freezing point but become an amorphous glass; as a result they are subject to supercooling. As shown, mixtures of these compounds in nearly all proportions are characterized by lower apparent freezing points than either of the compounds themselves. An optimum composition comprises about 70% butyrolactone and 30% N-methylpyrrolidone, this being a eutectic mixture which has the very low apparent freezing point of about —76° C. Particularly noteworthy is the constant boiling point of about 200–205° C. which characterizes the solvent mixture in all proportions of its ingredients. This property affords the advantage of avoiding the differential elimination of the components by evaporation at elevated temperature, thus ensuring the constancy of the mixture and its electrical and other properties. Moreover, whereas N-methylpyrrolidone taken alone would have an operating range of about 203° C. to —24° C. and and butyrolactone a range of about 203° C. to —44° C., when mixed together in the stated proportions of 30 and 70% respectively, they provide a mixture having the unexpectedly wide range of about 203° C. to —76° C.

While the invention includes within its scope mixtures of butyrolactone and N-methylpyrrolidone in all proportions, particularly satisfactory results are obtained by mixtures in the range of 15–75% N-methylpyrrolidone and 85–25% butyrolactone which have an apparent freezing point below —55° C., and preferred mixtures are those in the range of 20–45% N-methylpyrrolidone and 80–55% butyrolactone which have an apparent freezing point below —68° C.

The ionogen component used in the electrolyte mixture of the invention is generally present in small amounts, and ordinarily an amount thereof is employed which is sufficient to provide adequate resistivity of the electrolyte for the voltage applied to the capacitor in operation. In general, ionogens which may be used are salts comprising a non-reactive metallic cation or a non-metallic cation and a non-reactive film-sustaining anion, or acids from which such salts are derived. Examples of suitable ionogens are lithium nitrate; ammonium nitrate; organic acids such as acetic, formic, propionic and oxalic acids; and ammonium salts of such acids, such as ammonium acetate, ammonium formate, etc. Other ionogen compounds which may be used are ammonum thiocyanate, potassium thiocyanate, potassium permanganate, ammonium sulfide, ammonium molybdate, and aluminum chloride hexahydrate, it being understood that the invention is not limited to the specific compounds mentioned.

Preferably, high solubility ionogens, such as the aforementioned ammonium nitrate or lithium nitrate, are used in order to obtain a broad range of resistivity for the electrolyte. From a practical standpoint, a minimum resistivity of about 10 ohm-centimeters is usually provided for the electrolyte, with the upper limit depending on the operating voltage to be applied to the capacitor. Accordingly, the iongen used may be present in widely varying proportions from trace amounts to a saturating amount at minimum operating temperature. Mineral acids in high concentration should generally be avoided in the electrolyte to prevent hydrolysis of the solvent mixture.

Other materials as, for example dimethylsulfoxide, N-methylacetamide, ethylene glycol, and dimethylacetamide may be added to the electrolyte for various purposes as, for example, to vary the viscosity of the mixture or its degree of solvent action on the other components of the capacitor or electrolyte. Thus, there may be added to the electrolyte mixture a compound such as ethylene glycol to increase the viscosity of the solvent mixture.

A higher dielectric constant material such as N-methylacetamide may be added to the electrolyte to increase the solubility of inorganic components thereof, such as an ionogen compound.

An additive may be incorporated comprising a lower dielectric constant material such as tributylamine to decrease the viscosity of the electrolyte for facilitating and improving impregnation of the spacer material with the liquid electrolyte.

The following are examples of electrolyte compositions of the invention given in parts by weight, it being understood that the invention is not intended to be limited thereby in any way:

*Example I*

| | Parts |
|---|---|
| Butyrolactone | 70 |
| N-methylpyrrolidone | 30 |
| Lithium nitrate | 2 |

*Example II*

| | Parts |
|---|---|
| Butyrolactone | 40 |
| N-methylpyrrolidone | 60 |
| Lithium nitrate | 2 |

The resistivity of this composition is 230 ohm-centimeters at 25° C.

*Example III*

| | Parts |
|---|---|
| Butyrolactone | 25 |
| N-methylpyrrolidone | 25 |
| Tributylamine | 50 |
| Ammonium nitrate | 1 |

*Example IV*

| | Parts |
|---|---|
| Butyrolactone | 25 |
| N-methylpyrrolidone | 25 |
| Ethylene glycol | 84 |
| Ammonium biborate | 8 |

The resistivity of this electrolyte is 565 ohm-centimeters at 25° C.

*Example V*

| | Parts |
|---|---|
| Butyrolactone | 33 |
| N-methylpyrrolidone | 54 |
| Dimethylsulfoxide | 13 |
| Ammonium nitrate | 0.1 |

This composition has a resistivity of about 1,000 ohm-centimeters at room temperature and about 11,000 ohm-centimeters at —55° C. The scintillation voltage is about 330 volts D.C.

*Example VI*

| | Parts |
|---|---|
| Butyrolactone | 32 |
| N-methylpyrrolidone | 48 |
| N-methylacetamide | 20 |
| Ammonium nitrate | 0.1 |

The resistivity of this electrolyte was 1,000 ohm-centimeters at room temperature and 18,000 ohm-centimeters at —55° C., and the scintillation voltage was 375 volts D.C.

Life tests conducted on capacitors containing the electrolyte composition of the present invention under conditions of 125° C. at 350 volts D.C. have shown continued satisfactory operation of such capacitors for over 4,000 hours without failure.

In a further test of capacitors under high temperature conditions, the electrolyte composition corresponding to that of Example II above was incorporated in a capacitor comprising a glass spacer separating tantalum electrodes encased in an iron-nickel alloy casing and sealed by a compression glass hermetic seal of known type. These capacitors were tested under conditions of over 200° C. with thermocycling to —55° C. and voltages ranging from 47 volts D.C. to 75 volts D.C. Under such conditions, successful operation was encountered even after 3400 hours. The variation of capacitance of these units between the temperatures of 25° C. and —55° C. was found to be not more than 5%.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrolytic capacitor comprising a pair of electrodes at least one of which is composed of a film-forming metal having a dielectric film thereon and an electrolyte comprising a mixture in percent by weight of 85–25% butyrolactone and 15–75% N-methylpyrrolidone and having a boiling point of about 200° C. and an apparent freezing point below −55° C., and an ionogen dissolved therein in an amount to provide a resistivity for the electrolyte of at least about 10 ohm-centimeters at room temperature.

2. An electrolytic capacitor comprising a pair of electrodes at least one of which is composed of a film-forming metal having a dielectric film thereon and an electrolyte comprising a mixture in percent by weight of 80–55% butyrolactone and 20–45% N-methylpyrrolidone and having a boiling point of about 200° C. and an apparent freezing point below −55° C., and an ionogen dissolved therein in an amount to provide a resistivity for the electrolyte of at least about 10 ohm-centimeters at room temperature.

3. An electrolytic capacitor comprising a pair of electrodes at least one of which is composed of a film-forming metal having a dielectric film thereon and an electrolyte comprising a mixture in percent by weight of 70% butyrolactone and 30% N-methylpyrrolidone and having a boiling point of about 200° C. and an apparent freezing point below −76° C., and an ionogen dissolved therein in an amount to provide a resistivity for the electrolyte of at least about 10 ohm-centimeters at room temperature.

4. An electrolytic capacitor comprising a pair of electrodes at least one of which is composed of a film-forming metal having a dielectric film thereon, and an electrolyte comprising a mixture in percent by weight of 85–25% butyrolactone and 15–75% N-methylpyrrolidone and having a boiling point of about 200° C. and an apparent freezing point below −55° C., and an ionogen dissolved therein selected from the group consisting of ammonium nitrate and lithium nitrate.

5. An electrolytic capacitor comprising a pair of electrodes at least one of which is composed of a film-forming metal having a dielectric film thereon, and an electrolyte comprising a mixture in percent by weight of 85–25% butyrolactone and 15–75% N-methylpyrrolidone and having a boiling point of about 200° C. and an apparent freezing point below −55° C., and an ionogen dissolved therein comprising a compound selected from the group consisting of salts comprising a non-reactive metallic cation and a film-sustaining anion, salts comprising a non-metallic cation and a film-sustaining anion, and acids of said salts, said ionogen being dissolved therein in an amount to provide a resistivity for the electrolyte of at least 10 ohm-centimeters at room temperature.

6. An electrolytic capacitor as recited in claim 5 wherein a viscosity-modifying material miscible with said mixture is incorporated therein.

7. A liquid electrolyte for electrolytic capacitors comprising a mixture in percent by weight of 85–25% butyrolactone and 15–75% N-methylpyrrolidone and having a boiling point of about 200° C. and an apparent freezing point below −55° C., and having an ionogen dissolved therein in an amount to provide a resistivity for the electrolyte of at least 10 ohm-centimeters at room temperature.

8. A liquid electrolyte for electrolytic capacitors comprising a mixture in percent by weight of 80–55% butyrolactone and 20–45% N-methylpyrrolidone and having a boiling point of about 200° C. and an apparent freezing point below −68° C., and having an ionogen dissolved therein in an amount to provide a resistivity for the electrolyte of at least 10 ohm-centimeters.

9. A liquid electrolyte for electrolytic capacitors comprising a mixture in percent by weight of 70% butyrolactone and 30% N-methylpyrrolidone having a boiling point of about 200° C. and an apparent freezing point below −68° C., and having an ionogen dissolved therein in an amount to provide a resistivity for the electrolyte of at least 10 ohm-centimeters.

10. A liquid electrolyte for electrolytic capacitors comprising a mixture in percent by weight of 85–25% butyrolactone and 15–75% N-methylpyrrolidone and having a boiling point of about 200° C. and an apparent freezing point below −55° C. and having an ionogen selected from the group consisting of ammonium nitrate and lithium nitrate dissolved therein in an amount to provide a resistivity for the electrolyte of at least 10 ohm-centimeters.

11. A liquid electrolyte recited in claim 7 wherein a viscosity-modifying material miscible in said mixture is incorporated therein.

References Cited by the Examiner
UNITED STATES PATENTS

| | | | |
|---|---|---|---|
| 2,089,683 | 8/1937 | Clark | 317—230 |
| 2,089,685 | 8/1937 | Clark | 317—230 |
| 2,809,958 | 10/1957 | Barnes | 260—78 |
| 2,965,690 | 12/1960 | Petersen et al. | 317—230 |
| 3,065,389 | 11/1962 | Mohler et al. | 317—230 |
| 3,085,931 | 4/1963 | Darlington | 260—326.5 |
| 3,136,780 | 6/1964 | Kolyer et al. | 260—326.5 |

JOHN W. HUCKERT, *Primary Examiner.*

J. D. KALLAM, *Assistant Examiner.*